(12) United States Patent
Dobbek

(10) Patent No.: US 6,587,300 B1
(45) Date of Patent: *Jul. 1, 2003

(54) PERSONALIZATION OF DASD SERVO PARAMETERS THROUGH CALIBRATION FEEDBACK

(75) Inventor: Jeffrey J. Dobbek, San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1176 days.

(21) Appl. No.: 08/629,686

(22) Filed: Apr. 9, 1996

(51) Int. Cl.[7] ............................. G11B 21/02; G11B 19/02
(52) U.S. Cl. ................................. 360/75; 360/71
(58) Field of Search ........................ 360/71, 69, 77.04, 360/75, 31, 77.02, 78.04

(56) References Cited

U.S. PATENT DOCUMENTS

| 4,907,212 A | 3/1990 | Pharris et al. ................. 369/45 |
|---|---|---|
| 4,979,055 A | 12/1990 | Squires et al. ................. 360/69 |
| 5,070,495 A | 12/1991 | Bletscher, Jr. et al. ....... 369/116 |
| 5,113,384 A | 5/1992 | McDonald et al. ......... 369/44.29 |
| 5,134,602 A | 7/1992 | Baca et al. ................ 369/44.27 |
| 5,185,681 A | 2/1993 | Volz et al. ................. 360/77.05 |
| 5,216,655 A | 6/1993 | Hearn et al. ..................... 369/58 |
| 5,220,546 A | 6/1993 | Fennema ........................ 369/32 |
| 5,251,194 A | 10/1993 | Yoshimoto et al. ........ 369/44.26 |
| 5,341,360 A | 8/1994 | Johann et al. ............... 369/116 |
| 5,345,347 A | * 9/1994 | Hopkins et al. ............... 360/71 |
| 5,408,591 A | 4/1995 | Shih et al. ................... 395/105 |
| 5,450,383 A | 9/1995 | Call et al. .................... 369/116 |
| 5,455,934 A | 10/1995 | Holland et al. .............. 395/404 |

* cited by examiner

*Primary Examiner*—Andrew L. Sniezek
(74) *Attorney, Agent, or Firm*—Altera Law Group, LLC (57) ABSTRACT

An apparatus for calibrating a disk drive including a calibration circuit for calibrating parameters used in the operation of the disk drive. The system includes volatile storage for storing a personalized parameter value generated by the calibration circuit. The system also includes non-volatile storage for storing the personalized parameter value for subsequent use in calibrating the disk drive.

38 Claims, 5 Drawing Sheets

PERSONALIZATION OF DASD SERVO PARAMETERS THROUGH CALIBRATION FEEDBACK

BACKGROUND OF THE INVENTION

1. Field of the Invention

This invention relates in general to a method and apparatus for calibrating disk drives, and more particularly, to a method and apparatus for using personalized calibration data to calibrate disk drives.

2. Description of Related Art

Various types of data storage devices have been developed including high capacity devices that have multiple recording surfaces. A conventional magnetic or optical storage device is typically manufactured as three separate assemblies, the medium, the heads and the controller, which are integrated as a single storage device during one of the final steps in the production process.

A conventional medium assembly includes a plurality of double sided disks arranged in a stack on a central spindle typically rotated by a motor. Each side of each disk is usually plated with a magnetically or optically sensitive coating to form a recording surface for information which is organized in sectors spaced along concentric or spiral tracks on each of the recording surfaces.

The head assembly is used for recording and retrieving the information stored in a sector. Generally the head assembly includes at least one read/write head for each of the surfaces. Each head is typically mounted on a positioning arm which is linked to a servo positioning mechanism capable of moving all heads in unison in a generally radial direction over the recording surfaces. Some storage devices may include multiple head assemblies for a single medium assembly.

The controller assembly is used for managing the information flow between the computer system and the medium. A conventional controller assembly may include one or more microprocessors and memories to perform the complex tasks of address translation, head positioning, data transfer, data correction and performance optimization.

During the power-up sequence of a disk drive, a number of parameters are calibrated to enable reading of information from the storage disk. The parameters are conventionally determined by tuning a set of default parameters stored in non-volatile memory to the specific operating environment of the disk drive. The tuned values are maintained in volatile memory and may periodically be updated by the drive's maintenance operations to reflect changing conditions such as temperature. However, the calibrated values are not permanently stored, and are lost when the power to the drive is turned off.

Although some parameters have previously been stored on the disk itself, all parameters can not solely be stored on the disk because certain parameters are needed by the servo processor during spin up in order for the head to read data from the disk. The need for initial spin up parameters is especially critical with the use of magneto-resistive heads which require accurate adjustment, increasing track densities which require extremely accurate positioning of the head, and other drive elements requiring accurate tuning. With offsets between the read/write elements of MR heads approaching full tracks, reading stored calibration information on the drive and obtaining system data for drive use without having the data during the power-up sequence is difficult. The precise calibration of such elements causes time delays which negatively impact-drive readiness and the overall disk drive performance. Further, different calibrations may be necessary for manufacturing and field environments.

It can be seen that there is a need for an apparatus, method, and/or system that improves disk drive performance by reducing calibration times.

It can also be seen that there is a need for different calibrations being provided quickly for both manufacturing and field environments.

SUMMARY OF THE INVENTION

To overcome the limitations in the prior art described above, and to overcome other limitations that will become apparent upon reading and understanding the present specification, the present invention discloses a technique for enhancing calibration speed and performance of a data storage system.

The present invention solves the above-described problems by providing a technique for calibrating a disk drive that uses personalized calibration data/parameter values stored in non-volatile memory to calibrate the disk drive rather than default parameters based, for example, on population averages.

A system in accordance with the principles of the present invention includes a calibration system/circuit which comprises hardware, software, or a combination of both for calibrating a parameter used in the operation of the disk drive. The system also includes volatile storage for temporarily storing a personalized parameter value generated by the calibration circuit. The system further includes non-volatile storage for storing the personalized parameter value for subsequent use in calibrating the disk drive.

An important aspect of the present invention is that the personalized parameter value stored in non-volatile memory can be updated with a subsequent personalized parameter value in response to systems operations changes.

Another aspect of the invention is that the personalized parameter value can be read to a buffer, merged with a control program, and then saved in non-volatile memory for use in subsequent calibrations.

Another aspect of the present invention is that the calibration circuit includes a control means and a sensor.

Another aspect of the present invention is that the personalized parameter value can be stored in RAM of an interface processor while a working copy of the personalized parameter value can be stored in RAM of a servo processor.

Another aspect of the present invention is that a second copy of the personalized parameter value can be saved on the disk associated with the disk drive.

Another aspect of the present invention is that the calibration circuit is on the disk drive.

Another aspect of the present invention is that the calibration system or elements thereof is remote from the disk drive.

Another aspect of the present invention is that a buffer remote from the disk drive is used to merge control program parameters and personalized parameter values.

Another aspect of the present invention is that a buffer on the disk drive is used to merge control program parameters and personalized parameter values.

Still another aspect of the present invention is that the system can be used to calibrate a disk drive having a replacement control card.

Yet another aspect of the present invention is that the system can be used to personalize replacement control cards for a disk drive.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method, apparatus, and disk drive system that use calibration feedback to generate personalized calibration data/parameter valves.

Figure 1:
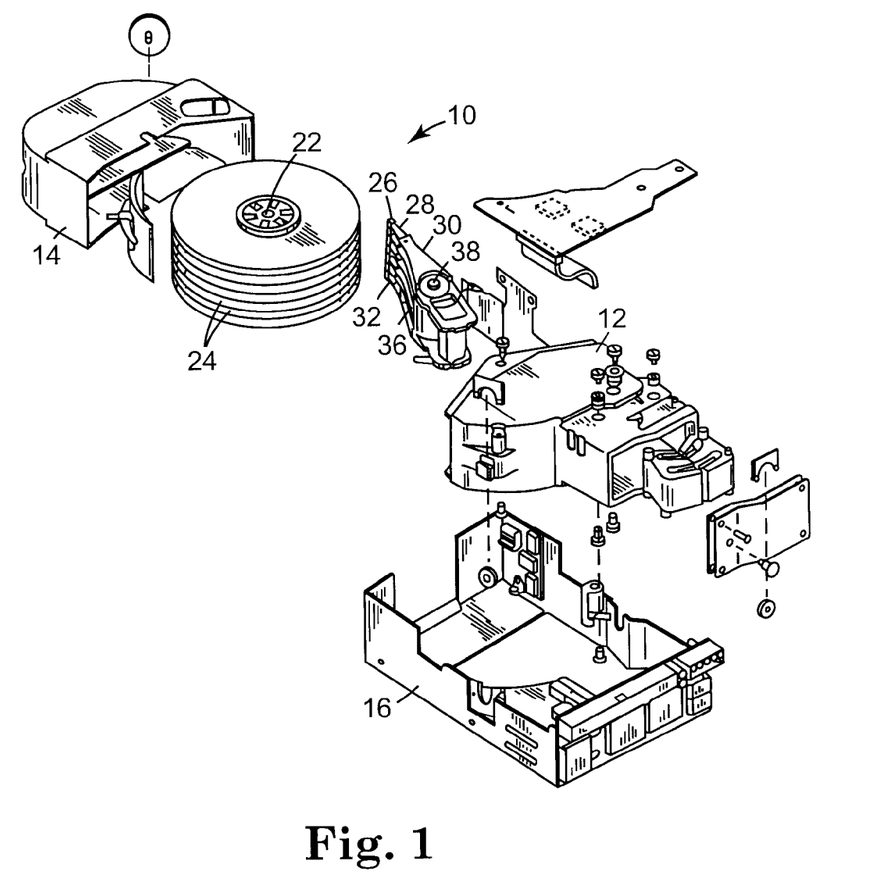
FIG. 1 is an exploded view of a magnetic storage device according to the present invention.

FIG. 1 illustrates an exploded view of a magnetic storage system 10. The disk drive 10 includes a housing 12 is and a housing cover 14 which, after assembly, is mounted within a frame 16. Mounted within the housing is a spindle shaft 22. Rotatably attached to the spindle shaft 22 are a number of magnetic storage disks 24. In FIG. 1, eight disks 24 are attached to the spindle shaft 22 in spaced apart relation. The disks 24 rotate on spindle shaft 22 which is powered by a motor (not shown). Information is written on or read from the disks 24 by heads or magnetic transducers (not shown) which are supported by sliders 26. Sliders are coupled to the suspensions or load springs 28. The load springs 28 are attached to separate arms 30 on an E block or comb 32. The E block or comb 32 is attached at one end of an actuator arm assembly 36. The actuator arm assembly 36 is rotatably attached within the housing 12 on an actuator shaft 38. The rotary actuator assembly 36 moves the integrated transducer/suspension assembly in accordance with the present invention in an arcuate path across the surface of the storage disk 24. However, the invention is not meant to be limited to the disk drive described above. Those skilled in the art will recognize that personalized calibration data/parameter valves using calibration feedback according to the invention may be implemented with any configuration of disk drive or direct access storage device (DASD) including magnetic tape drives, for example.

Figure 2:
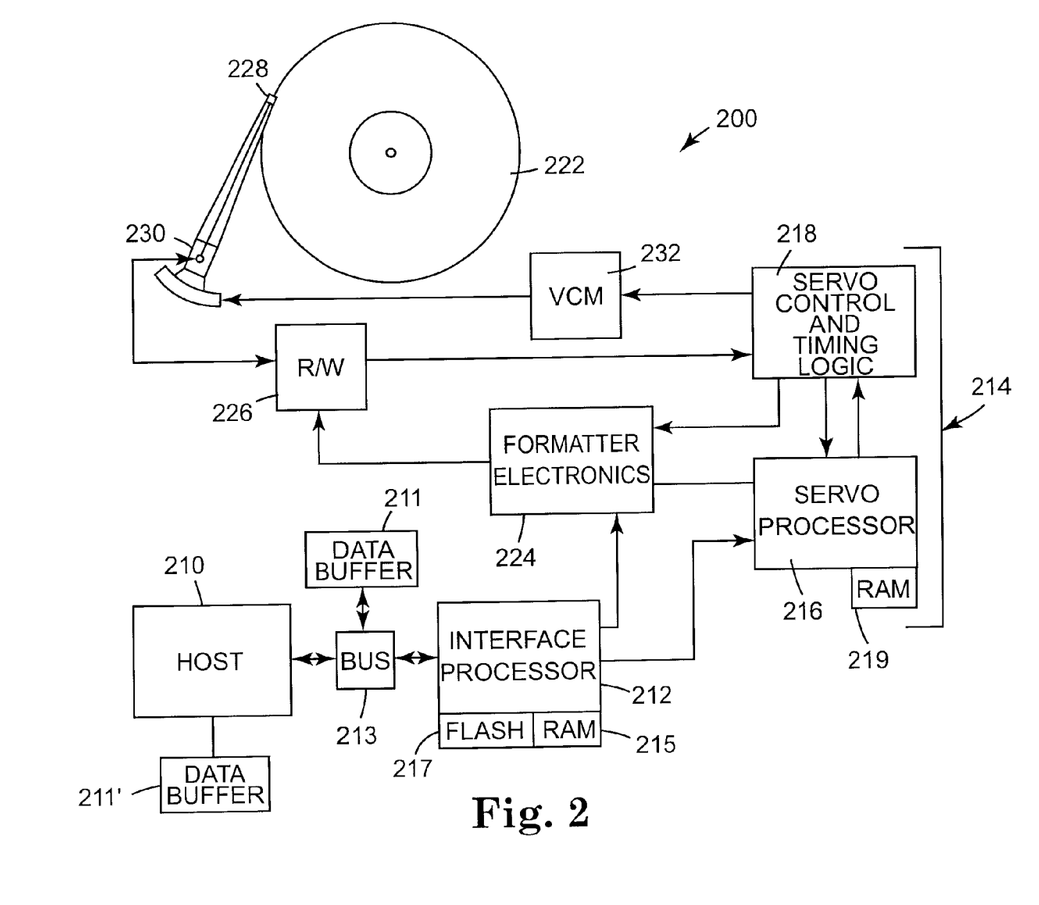
FIG. 2 illustrates a block diagram of a computer disk drive system in accordance with the invention.

FIG. 2 illustrates a block diagram of a computer disk drive system 200 suitable for practicing the invention. It shall be understood that the general read/write and servo functions of a disk drive are well-known in the art, and their particular implementation is not an aspect of the present invention unless expressly noted. A host computer system 210 is coupled to an interface processor 212 via a buss interface 213. The interface processor 212 and the buss interface 213 link the host system 210 to a servo controller 214. The host computer system 210 is also coupled to a data buffer 211 adapted for temporarily storing microcode and data via buss interface 213. It will be appreciated that host computer can alternatively be coupled to a data buffer 211' remotely located from the drive. The interface processor is associated with random access memory (RAM) 215 for storing data and control signals and a flash memory 217 or other non-volatile memory for storing program control microcode such as servo operations code, servo design constants, interface processor microcode, and other code utilized in the operation of the disk drive 200.

The servo controller 214 includes a servo processor 216 and servo control and timing logic 218. Associated with the servo processor 216 is RAM 219 for storing data and control signals. Data parameters may also be stored on the disk 222 itself, such as in a reserve section of the disk 222. The servo processor 216 is coupled to the interface processor 212 and receives commands across the interface processor 212.

Data to be written to the disk 222 is routed to the formatter electronics 224. The read/write circuit 226 conditions the data and routes the data to the head 228 at the end of the actuator arm 230 for writing to the disk 222. Data read from the disk. 222 by the head or sensor 228 is received by the read/write circuit 226. The data received from the head 228 is conditioned by the read/write circuit 226 to provide a read pulse output. The read pulse output is then routed to the formatter electronics 224 for processing before being provided to the host 210 via the data buffer 212 and buss interface 213.

The servo processor 216 provides control signals to the servo control and timing logic 218. The servo control and timing logic 218 interprets the control signals from the servo processor 216 and sends voice coil control signals to the voice coil motor 232. The voice coil motor 232 drives the actuator arm 230 in accordance with the control signals. The actuator arm 230 supporting the magnetic head 228 is driven by the voice coil motor 232 to move the magnetic head 228 to a target track position on the disk 222. The servo control and timing logic 218 outputs to the servo processor 216 position data indicative of the track position corresponding to the current position of the magnetic head 228 from servo data read out from the disk 222.

Although interface and servo processors 212 and 216 are shown in FIG. 2, it will be appreciated that the present invention is not limited to a dual processor environment.

Disk drive systems require calibration to effectively interface with a disk. With magneto-resistive heads and increased disk density, the need for accurate calibration is increased. A variety of performance characteristics are typically calibrated in a disk drive. One such performance characteristic that may be measured is runout. Runout is the difference between the actual centerline of a track and the effective centerline presented to a head positioned a fixed distance from the mounting center of the disk. Runout may, for example, be caused by slight eccentricity in the mounting of the disk on its drive spindle. Runout from a drive's own spindle motor may be measured using the disk drive magnetic head or sensor so that an RRO cancellation control may be calculated to cancel the effect of the runout.

Other exemplary performance characteristics that typically require calibration include automatic gain compensation (AGC), torque factor $K_c$, and seek-settle criteria. AGC relates the strength or weakness of a signal generated by the head and to the vertical flying height of the head relative to a disk $K_c$ relates to the torque response of the actuator arm to the amount of current applied to the voice coil. Seek-settle criteria relates to the criteria used to determine that settle is obtained such that read and write functions are provided by the actuator head.

Typically, such performance characteristics are measured using the disk driver's head or sensor. The measurements are sent to the driver's servo processor in the form of feedback signals. The servo processor receives the feedback signals and, possibly, in cooperation with the interface processor, determines if the drive is operating at an optimal level. If the drive is not operating at an acceptable level, the servo processor iteratively generates calibration data, such as RRO cancellation data in the case of runout, that is used to correct the performance characteristics of the drive.

Figure 3:
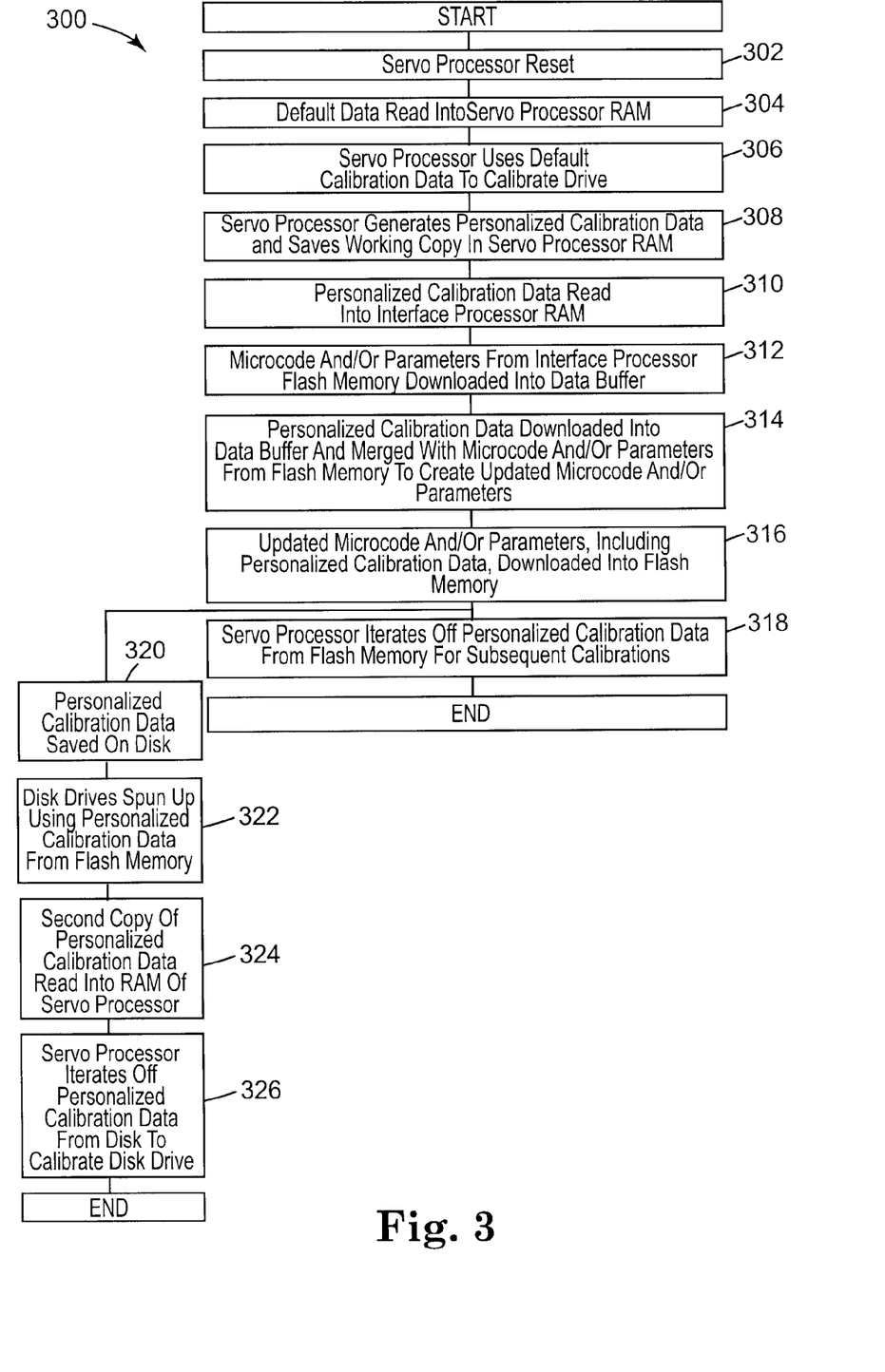
FIG. 3 illustrates a flow chart of a calibration method according to the present invention.

FIG. 3 illustrates a flow chart of a disk drive calibration method 300 suitable for practicing the present invention. The method uses calibration feedback to develop personalized calibration data parameter valves for the disk drive 200. The method is preferably initially utilized at the manufacturing stage of the disk drive. However, the method can be repeated at any time to update the calibration data.

In the method 300, the disk drive servo processor 216 is first reset 302 and default or "best guess" calibration data is read 304 into the RAM 219 associated with the servo processor 216. Default calibration data includes population numbers that are selected so as to be compatible with virtually all disk drives. Although default calibration data is compatible with most disk drives, it yields optimal results in only a small percentage of disk drives because many time consuming iterations are typically required before the drive is properly calibrated. Consequently, the calibration process is significantly slower than a process using calibration data that is personalized for a specific disk drive. The term personalized means that the calibration data/parameter values are tuned to the operating characteristics of a specific disk drive. Because personalized calibration data is precisely tuned to a particular disk drive, fewer iterations are required during the calibration process thereby reducing calibration time.

The servo processor 216 iterates off of the default calibration numbers according to generally understood processes to initially calibrate 306 the disk drive 200. The servo processor 216 concurrently generates personalized calibration data/parameter values as the disk drive 200 is calibrated. A working copy of the personalized calibration data is saved 308 in the servo processor RAM 219. When the calibration is successful, the personalized calibration data is read 310 into RAM 215 associated with the interface processor 212. If the servo controller 214 of the disk drive 200 has to be completely reset, the personalized calibration data saved in the interface processor RAM 215 can be used to re-initialize the calibrations without a full re-calibration operation.

In accordance with the present invention, control programming such as servo operations code/parameters, servo design constants, interface processor microcode, and other code utilized in the operation of the disk drive 200, is downloaded 312 from the interface processor flash memory 217 to a data buffer 211 or 211'. Concurrently, the personalized calibration data is downloaded from the interface RAM 215 to the data buffer 211 or 211' and merged 314 with the microcode downloaded from flash memory 217. The resultant updated microcode, which includes the personalized calibration data, is then downloaded 316 or flashed back into the flash memory 217 of the interface processor 212.

It will be appreciated that a switch, typically in a download command, determines whether the flash 217 will be updated with the personalized calibration data. If the switch is in a first position, the flash 217 is not updated. If the switch is in a second position, the flash 217 is updated with the personalized calibration data.

When the disk drive 200 is subsequently powered off and then later powered up, the personalized calibration data is read from the flash memory 217 into the servo processor RAM 219 thereby enabling the servo processor 216 to use the personalized calibration data to calibrate 318 the disk drive 200. In calibrating the disk drive 200, the servo processor can 216 iterate directly off of the personalized calibration data provided from flash memory 217. The personalized calibration data will remain in flash memory until the process is subsequently invoked and the calibration data is replaced with subsequent calibration data.

It will be appreciated that the control circuitry of a disk drive is often mounted on a replaceable card within the disk drive. At times, the card within a particular disk drive is required to be "swapped" or interchanged with another card. For example, card swapping techniques are usually used to determine whether a given card is faulty.

The personalization of cards with respect to specific disk drives presents problems for card swapping. For example, if a card personalized for a first disk drive is placed in a second disk drive, it is likely that the personalized calibration parameters stored in flash memory on the card will be incompatible with the second disk drive.

Another aspect of the method 300 provides a recalibration sequence that is preferably applicable to a disk drive 200 that is designed for card swapping. In such a method, a second copy of the personalized calibration data from the interface processor RAM 215 is saved 320 on the reserve section of the disk drive's storage disk 222. The second copy of the personalized calibration data functions as a back-up in the event the processing circuitry of the disk drive 200 is replaced in the field. However, prior to a card swap situation, the personalized calibration data stored in flash memory 217 of the interface processor 212 is used by the servo processor 216 to spin up 322 the disk drive 200 and seek to the reserve section of the disk 222. The second copy of the personalized calibration data is read 324 from the reserve section of the disk 220 into the RAM 219 of the servo processor 216. The servo processor 216 iterates off 326 the second copy of personalized calibration data to calibrate the disk drive 200. The use of personalized data to spin up the drive reduces calibration times. The card swap situation is described in greater detail with respect to FIG. 5.

It will be appreciated that environmental conditions and other factors can affect the operational characteristics of a disk drive. As a result, personalized calibration data saved in flash memory at the time the disk drive is manufactured may not yield optimal results when the disk drive is used in the field. In such a situation, it is desirable to replace the original personalized calibration data with new, personalized "field" calibration data. If desired, selected parameters can be permanently saved and not subject to subsequent change.

Figure 4:
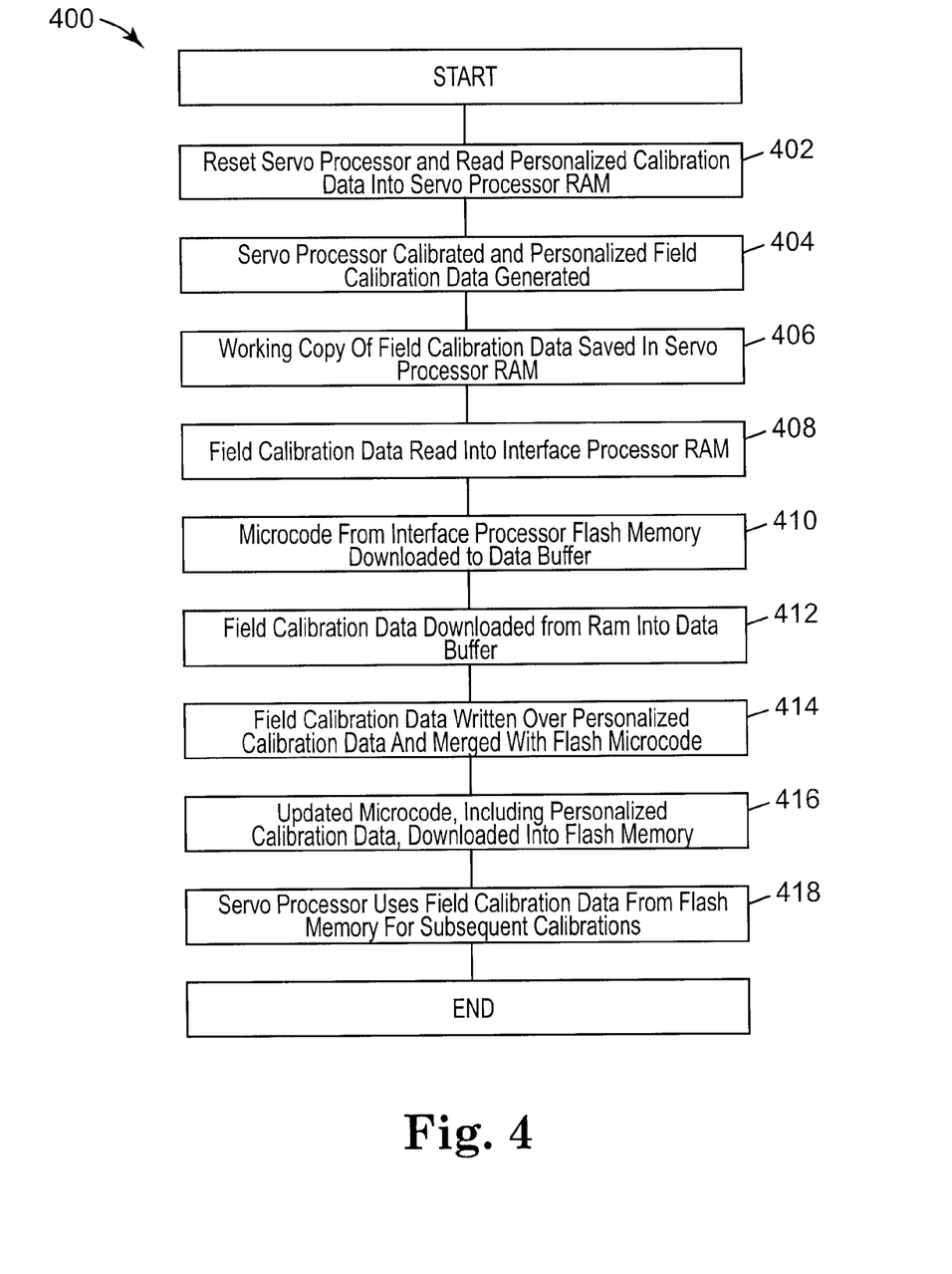
FIG. 4 illustrates a flow chart of another calibration method according to the present invention.

FIG. 4 illustrates a flow chart of a calibration method 400 that allows original personalized calibration data to be replaced or updated with subsequent "field" calibration data. The method includes resetting the servo processor 216 and reading 402 personalized calibration data into the RAM 219 of the servo processor 216. The disk drive 200 is then powered or spun up and the servo processor 216 calibrates the disk drive 200 starting with the personalized calibration data saved in flash memory 217. As the disk drive 200 is calibrated, the servo processor 216 generates subsequent personalized "field" calibration data 404. A working copy of the personalized field calibration data is saved 406 in the servo processor RAM 219. When the calibration is successful, the "field calibration" data is read 408 into RAM 215 of the interface processor 212.

The contents of the interface processor flash memory 217, such as merged control programming and original personalized calibration data, are then commanded to be downloaded 410 into a data buffer. The data buffer may be on the disk drive or remote from the disk drive. The command contains a switch that forces the "field" calibration data from the interface processor RAM 215 to also be downloaded 412 into the data buffer. The "field" calibration data is written over 414 the original personalized calibration data and thereby becomes merged with the contents of the flash memory 217 to produce an updated microcode. The updated microcode is then downloaded back 416 into the flash memory 217 of the interface processor 212. When the disk drive is subsequently powered up 418, the "field" calibration data is read from the flash memory 217 into the servo processor RAM 219 thereby enabling the servo processor 216 to use the "field" calibration data to subsequently calibrate the disk drive 200.

It will be appreciated that the switch described in the previous paragraph is preferably a two way switching mechanism that is preferably within the download command but could also be in data. The switching mechanism determines whether the contents of the data buffer will be updated with the "field" calibration data from the interface processor RAM 215 or downloaded with personalized field calibration data that previously existed in flash memory 217. Typically, the contents of the flash 217 are downloaded into the data buffer and initially merged with new servo constant fields provided from an external download entity. Next, calibration fields/data need to be downloaded into the data buffer. If the switch is in a first position, existing calibration data/fields from flash 217 are downloaded into the data buffer. If the switch is in a second position, "field" or "feed back" calibration data is downloaded into the data buffer from the interface processor RAM 215.

Figure 5:
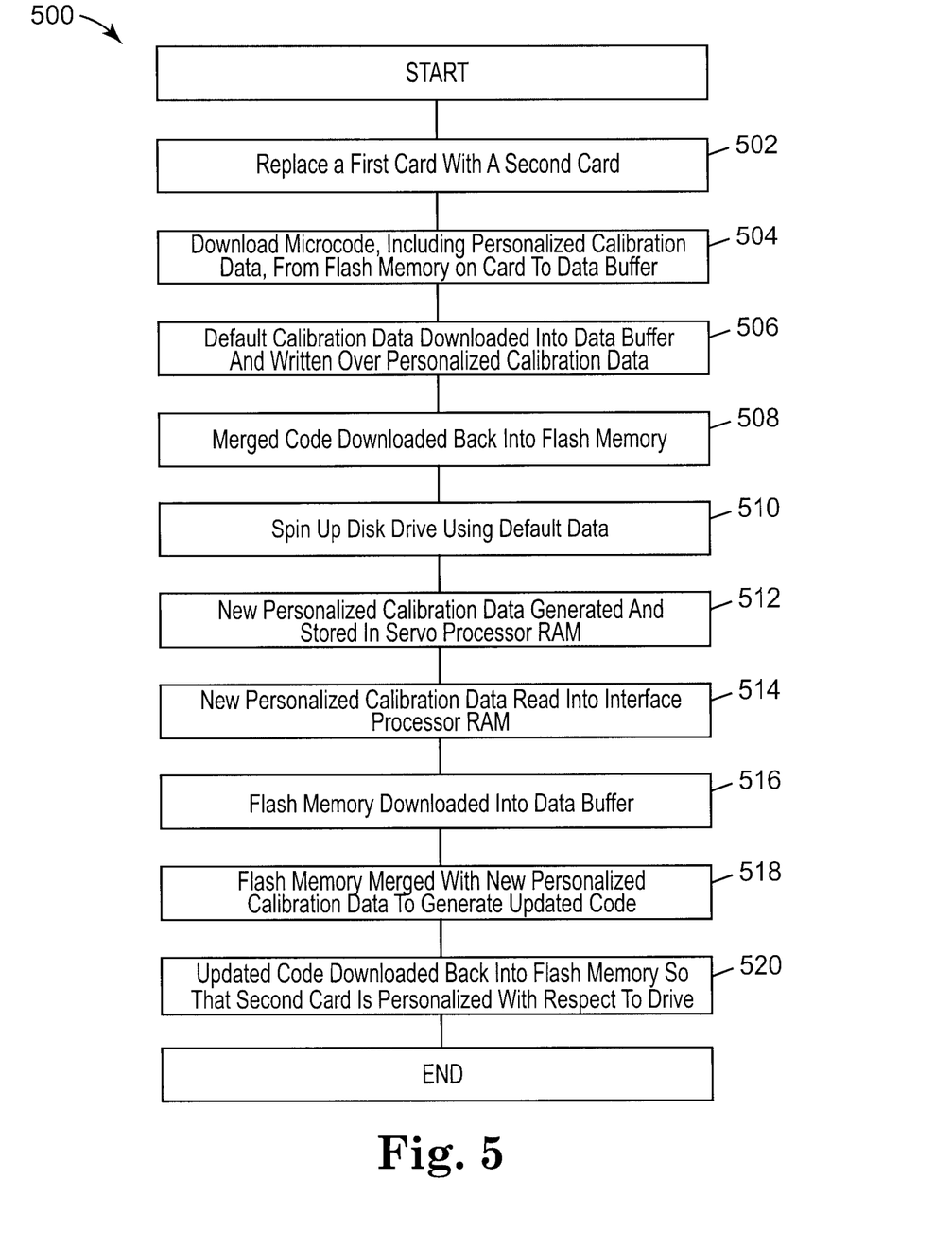
FIG. 5 illustrates a flow chart of an additional calibration feedback method according to the present invention.

FIG. 5 illustrates a flow chart of another calibration method 500 that allows a disk drive 200 having a swapped card to be calibrated. The method includes swapping a first card with a second card 502. The contents of the flash memory of the second card, including personalized calibration data, is then downloaded 504 into a data buffer either on the drive or remote from the drive 200. Next, default calibration parameter values are loaded into the buffer and written over 506 the personalized calibration data to generate an updated code. The updated code is then downloaded back 508 into the flash memory of the second card and the default parameter values are read from flash memory to the interface processor RAM. Alternatively, the default servo parameter values could be downloaded from the buffer is directly into the interface processor RAM thereby by-passing the flash-back step.

The default parameter values are next read from the interface processor RAM to RAM associated with the servo processor on the second card. The servo processor uses the default calibration data to spin up 510 the disk drive and access manufacturing set calibration data from the reserve section of the disk. The manufacturing set data is preferably merged with the default data by marrying constant fields of the default data with calibration fields from the manufacturing set data. The manufacturing set calibration fields and the default constant fields are then used to calibrate the disk drive. As the disk drive 200 is calibrated, the servo processor generates new personalized calibration data/parameter values. The new personalized calibration parameter values are stored 512 in RAM of the servo processor. When the calibration is successful, the new personalized calibration data is read 514 into RAM of the interface processor.

If it is desired to personalize the second card with respect to the disk drive, the content of the flash memory can then be downloaded 516 into the data buffer and merged 518 with the new personalized calibration data/parameter is values from the interface processor RAM to produce an updated code. The updated code is then downloaded back 520 into the flash memory of the second card. In this manner, the second card is personalized with respect to the disk drive.

When the disk drive is subsequently powered off and then powered up at some time later, the new personalized calibration data is read from the flash memory of the card into the servo processor RAM. The servo processor uses the new personalized calibration data from flash memory to spin up the disk drive and-access the manufacturing set calibration data on the reserve section of the drive. The servo processor then uses constant fields provided by the personalized calibration data and calibration fields provided by the manufacturing set calibration data to calibrate the drive. By using the new personalized calibration data to spin up the drive, spin up and seek times are reduced as compared to using default data.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for calibrating a disk drive comprising:
   a first memory for storing a first set of parameters;
   a second memory for storing a second set of parameters;
   a third memory coupled to the first and the second set of parameters for merging the first and the second set of parameters to generate a merged set of parameters; and
   switch code having a first state for updating the second memory with the merged set of parameters, and a second state for preventing an update to the second memory, wherein content from the second memory is used to calibrate a disk drive.

2. The apparatus of claim 1, wherein the first memory is a volatile memory.

3. The apparatus of claim 2 further comprising means for replacing the first set of parameters in the first memory with the second set of parameters such that the volatile storage is updated.

4. The apparatus of claim 1, wherein the second memory is a non-volatile memory.

5. The apparatus of claim 1 further comprises a servo system, the servo system having at least a servo processor.

6. The apparatus of claim 5, wherein the servo processor further comprising RAM, the RAM being updated by the second memory.

7. The apparatus of claim 5, wherein the first memory stores personalized calibration parameters generated by the servo system.

8. The apparatus of claim 5 further comprising means for updating the merged set of parameters with personalized calibration parameters generated by the servo system.

9. The apparatus of claim 8, wherein the means for updating the merged set of parameters includes a data buffer.

10. The apparatus of claim 1, wherein a second copy of the of the first set of parameters is stored in a reserve section of the disk.

11. The apparatus of claim 1, wherein the first set of parameters comprise a personalized set of parameters.

12. The apparatus of claim 11, wherein the personalized set of parameters comprise an updated personalized set of parameters.

13. The apparatus of claim 11, wherein the second set of parameters comprise a default set of parameters.

14. The apparatus of claim 13, wherein the default set of parameters comprise a previously stored personalized set of parameters.

15. A disk drive, comprising:
a rotatable disk assembly including at least one disk for recording data thereon;
a housing, the rotatable disk assembly being attached to the housing;
an actuator arm assembly having a sensor for positioning relative to the at least disk;
a servo system including at least a servo processor, the servo system being coupled to the actuator arm assembly;
a first memory for storing a first set of parameters;
a second memory for storing a second set of parameters;
a third memory coupled to the first and the second memory for merging the first and the second set of parameters to generate a merged set of parameters;
a servo system including at least a servo processor, the servo system being coupled to at least the actuator arm assembly, the first memory and the second memory; and
switch code having a first state for updating the second memory with the merged set of parameters, and a second state for preventing an update to the second memory, wherein content from the second memory is used by the servo processor to calibrate the disk drive.

16. The disk drive of claim 15, wherein the first memory is a volatile memory.

17. The disk drive of claim 16 further comprising means for replacing the first set of parameters in the first memory with the second set of parameters such that the volatile storage is updated.

18. The disk drive of claim 15, wherein the second memory is a non-volatile memory.

19. The disk drive of claim 15, wherein the servo processor further comprising RAM, the RAM being updated by the content of the second memory.

20. The disk drive of claim 15, wherein the servo system uses the first set of parameters to spin up the disk drive, and a second copy of the first set of parameters to re-calibrate the disk drive.

21. The disk drive of claim 15, wherein a second copy of the of the first set of parameters is stored in a reserve section of the disk.

22. The disk drive of claim 15, wherein the first memory stores personalized calibration parameters generated by the servo system.

23. The disk drive of claim 22, wherein the personal calibration parameters are stored in a volatile storage.

24. The disk drive of claim 15 further comprising means for updating the merged set of parameters with personalized calibration parameters generated by the servo system.

25. The disk drive of claim 24, wherein the means for updating the merged set of parameters includes a data buffer.

26. The disk drive of claim 15 further comprises a default set of parameters are stored in a reserve section of the disk.

27. The disk drive of claim 15, wherein the first set of parameters comprise a personalized set of parameters.

28. The disk drive of claim 27, wherein the personalized set of parameters comprise an updated personalized set of parameters.

29. The disk drive of claim 27, wherein the second set of parameters comprise a default set of parameters.

30. The disk drive of claim 29, wherein the default set of parameters comprise a previously stored personalized set of parameters.

31. A method for re-calibrating a disk drive comprising:
calibrating a first set of parameters of the disk drive and generating a personalized set of parameters;
storing a first copy of the personalized set of parameters in non-volatile memory for subsequent use in powering-up the disk drive;
generating a subsequent set of parameters;
storing the subsequent set of parameters in volatile memory; and
merging the personalized set of parameters with the subsequent set of parameters to generate a merged set of parameters and subsequently using the merged set of parameters to power-up the disk drive.

32. The method of claim 31 further including the step of saving a second copy of the personalized set of parameters on a reserve section of a disk.

33. The method of claim 32 further comprising the steps of:
using the first copy of the personalized set of parameters to spin up the disk drive in order to access the second copy of the personalized parameters; and
using the second copy of the personalized set of parameters to calibrate the disk drive.

34. The method of claim 31, wherein the first set of parameters comprise a personalized set of parameters.

35. The method of claim 34, wherein the personalized set of parameters comprise an updated personalized set of parameters.

36. The method of claim 34 further comprising the step of storing a second set of parameters in the non-volatile memory.

37. The method of claim 36, wherein the second set of parameters comprise a default set of parameters.

38. The method of claim 37, wherein the default set of parameters comprise a previously stored personalized set of parameters.

* * * * *

UNITED STATES PATENT AND TRADEMARK OFFICE
CERTIFICATE OF CORRECTION

PATENT NO. : 6,587,300 B1
DATED : July 1, 2003
INVENTOR(S) : Dobbek

It is certified that error appears in the above-identified patent and that said Letters Patent is hereby corrected as shown below:

Drawings,
Fig. 3 No. 322: "Drives" should read -- Drive --.

Column 5,
Line 8, "disk" should read -- disk. --.

Column 9,
Line 10, delete "of the".

Column 10,
Line 2, delete "of the".

Signed and Sealed this

Thirteenth Day of January, 2004

JON W. DUDAS
*Acting Director of the United States Patent and Trademark Office*